(12) United States Patent
Baar

(10) Patent No.: US 11,858,565 B2
(45) Date of Patent: Jan. 2, 2024

(54) TRACK JOINT ASSEMBLY FOR GROUND-ENGAGING TRACK HAVING TRACK PIN WITH ENLARGED CENTER SECTION

(71) Applicant: Caterpillar Inc., Peoria, IL (US)

(72) Inventor: William Baar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 944 days.

(21) Appl. No.: 16/713,836

(22) Filed: Dec. 13, 2019

(65) Prior Publication Data

US 2021/0179212 A1  Jun. 17, 2021

(51) Int. Cl.
*B62D 55/21* (2006.01)
*B62D 55/08* (2006.01)
*B62D 55/20* (2006.01)
*B62D 55/06* (2006.01)
*B62D 55/088* (2006.01)

(52) U.S. Cl.
CPC ............. *B62D 55/21* (2013.01); *B62D 55/08* (2013.01); *B62D 55/202* (2013.01); *B62D 55/06* (2013.01); *B62D 55/0887* (2013.01)

(58) Field of Classification Search
CPC ........ B62D 55/00; B62D 55/08; B62D 55/18; B62D 55/20; B62D 55/205; B62D 55/21; B62D 55/202; B62D 55/06; B62D 55/0887

See application file for complete search history.

(56) References Cited

U.S. PATENT DOCUMENTS

| 2,621,981 | A | * | 12/1952 | Schick | B62D 55/0887 305/59 |
| 4,150,856 | A | * | 4/1979 | Hakkenberg | F16C 11/02 305/117 |
| 4,163,589 | A | * | 8/1979 | Fox | B62D 55/205 305/59 |
| 4,265,084 | A | * | 5/1981 | Livesay | F16G 13/06 59/7 |
| 4,735,465 | A | * | 4/1988 | Wiesner | B62D 55/205 305/59 |
| 5,257,858 | A | * | 11/1993 | Taft | B62D 55/21 305/204 |
| 2001/0001223 | A1 | * | 5/2001 | Miyaura | B62D 55/21 305/202 |
| 2005/0040708 | A1 | * | 2/2005 | Yamamoto | B62D 55/21 305/202 |

(Continued)

FOREIGN PATENT DOCUMENTS

| KR | 100997814 B1 | 12/2010 |
| WO | 8100223 | 2/1981 |
| WO | 2010113197 | 10/2010 |

*Primary Examiner* — Jacob D Knutson
*Assistant Examiner* — Abigail R Hymel

(57) ABSTRACT

A track joint assembly includes a first track chain and a second track chain, and a track pin including a first pin end, a second pin end, and a center section. A track guiding space extends between the first track chain and the second track chain. The center section of the track pin has an enlarged diameter, relative to first and second pin ends, and an outer wear surface exposed to the track guiding space. The outer wear surface may directly contact a rotatable track-engaging element in a ground-engaging track system, such as a sprocket.

19 Claims, 4 Drawing Sheets

(56) References Cited

U.S. PATENT DOCUMENTS

| | | | | |
|---|---|---|---|---|
| 2008/0141513 A1* | 6/2008 | Livesay | ................ | B21K 25/00 |
| | | | | 29/244 |
| 2008/0265667 A1 | 10/2008 | Livesay | | |
| 2009/0102281 A1* | 4/2009 | Diekevers | ............ | B62D 55/145 |
| | | | | 305/195 |
| 2010/0148575 A1* | 6/2010 | Johannsen | ............. | B62D 55/21 |
| | | | | 305/201 |
| 2017/0314983 A1* | 11/2017 | Rebinsky | .............. | G01F 23/263 |
| 2018/0029653 A1* | 2/2018 | Johannsen | ............. | B62D 55/21 |

\* cited by examiner

US 11,858,565 B2

TRACK JOINT ASSEMBLY FOR GROUND-ENGAGING TRACK HAVING TRACK PIN WITH ENLARGED CENTER SECTION

TECHNICAL FIELD

The present disclosure relates generally to a track joint assembly, and more particularly to a track pin having a center section with an enlarged diameter relative to ends of the track pin.

BACKGROUND

Various machines used in off-highway environments utilize tracks as ground-engaging propulsion elements, notably, track-type excavators and track-type tractors. Such tracks typically include rotatable track-engaging elements, with each of two tracks at opposite sides of the machine forming endless loops moved about the rotating elements during operation. Two parallel chains of coupled-together links, with bolted-on track shoes, is a typical configuration for each individual track. The demands placed upon such machines and their associated tracks can be quite substantial depending upon operating environment and particular working application. Machine tracks used in so-called production dozing, for example, are typically designed with more or less continuous travel and harsh underfoot conditions of the machine in mind, as the machine will commonly be driven to dig, push, and distribute material nearly continuously during service. Other applications including, for example, excavator applications, often employ tracks designed for softer or otherwise less challenging underfoot conditions and designed for only intermittent driving of the machine since much of excavating work takes place while the machine is stationary.

Understanding and addressing wear phenomena in machine tracks has received considerable engineering attention in recent years. The various wear phenomena and wear rates experienced by machine track are typically a result of how the machine is used as noted above, the skill and experience of the operator, and the particular underfoot conditions and substrate materials encountered in the operating environment. Field service life of machine track can vary based upon these and other factors. Since machine track components can be relatively expensive to service and replace, not to mention the negatives of machine downtime, engineering efforts in this field have often centered around reducing and managing wear between and among components. U.S. Pat. No. 4,150,856 to Hakkenburg et al. discloses one known example of a machine track design, including a one-piece track pin.

SUMMARY OF THE INVENTION

In one aspect, a track joint assembly includes a first track chain and a second track chain each having track links with an outboard link strap having an outboard pin bore, and an inboard link strap having an inboard pin bore. The track joint assembly also includes a track pin defining a longitudinal axis and having a first pin end, a second pin end, and a center section extending from the first pin end to the second pin end and having an outer wear surface. The track joint assembly also includes a first track joint having an outboard link strap in a track link in the first track chain, the first pin end, a first interference-fitted insert within the respective outboard pin bore and supporting the first pin end for rotation, and a first bearing surface extending circumferentially around the longitudinal axis. The first track joint further includes an inboard link strap in a track link in the first track chain, and a first portion of the center section positioned in the respective inboard pin bore. The track joint assembly further includes a second track joint having an outboard link strap in a track link in the second track chain, the second pin end, a second interference-fitted insert within the respective outboard pin bore and supporting the second pin end for rotation, and a second bearing surface extending circumferentially around the longitudinal axis. The second track joint further includes an inboard link strap in a track link in the second track chain, and a second portion of the center section positioned in the respective inboard pin bore. A track guiding space extends between the first track chain and the second track chain. The center section of the track pin has an enlarged diameter, relative to the first pin end and the second pin end, and the outer wear surface is exposed to the track guiding space.

In another aspect, a ground-engaging track system includes a track roller frame, and a ground-engaging track having a first track chain and a second track chain, each including track links, and track pins coupling the first track chain and the second track chain together. The track links each include an outboard link strap and an inboard link strap. The track pins each include a first pin end extending through and supported for rotation in an outboard link strap in a track link in the first track chain, a second pin end extending through and supported for rotation in an outboard link strap in a track link in the second track chain, and a center section extending from the first pin end to the second pin end. A track guiding space extends between the first track chain and the second track chain. The center section of each of the track pins includes an enlarged diameter, relative to the first pin end and the second pin end, positioned in part within inboard link straps in each of the first track chain and the second track chain and forming an outer wear surface exposed to the track guiding space.

In still another aspect, a track pin for a track joint assembly in a ground-engaging track system includes a solid pin body defining a longitudinal axis extending between a first pin end having a first terminal end surface, a second pin end having a second terminal end surface, and a center section extending between the first pin end and the second pin end. The center section includes a first lead-in chamfer and a second lead-in chamfer formed adjacent to the first pin end and the second pin end for interference-fitting, respectively, a first portion and a second portion of the center section with inboard link straps in the second track chain and the second track chain. The solid pin body has a full axial length, and the first pin end and the second pin end each have a pin end axial length. The center section has an enlarged diameter, relative to the first pin end and the second pin end, and a center section axial length. The enlarged diameter is greater than the pin end axial length. The center section axial length is from 60% to 63% of the full axial length, and from 314% to 318% of the pin end axial length.

DETAILED DESCRIPTION

Figure 1:
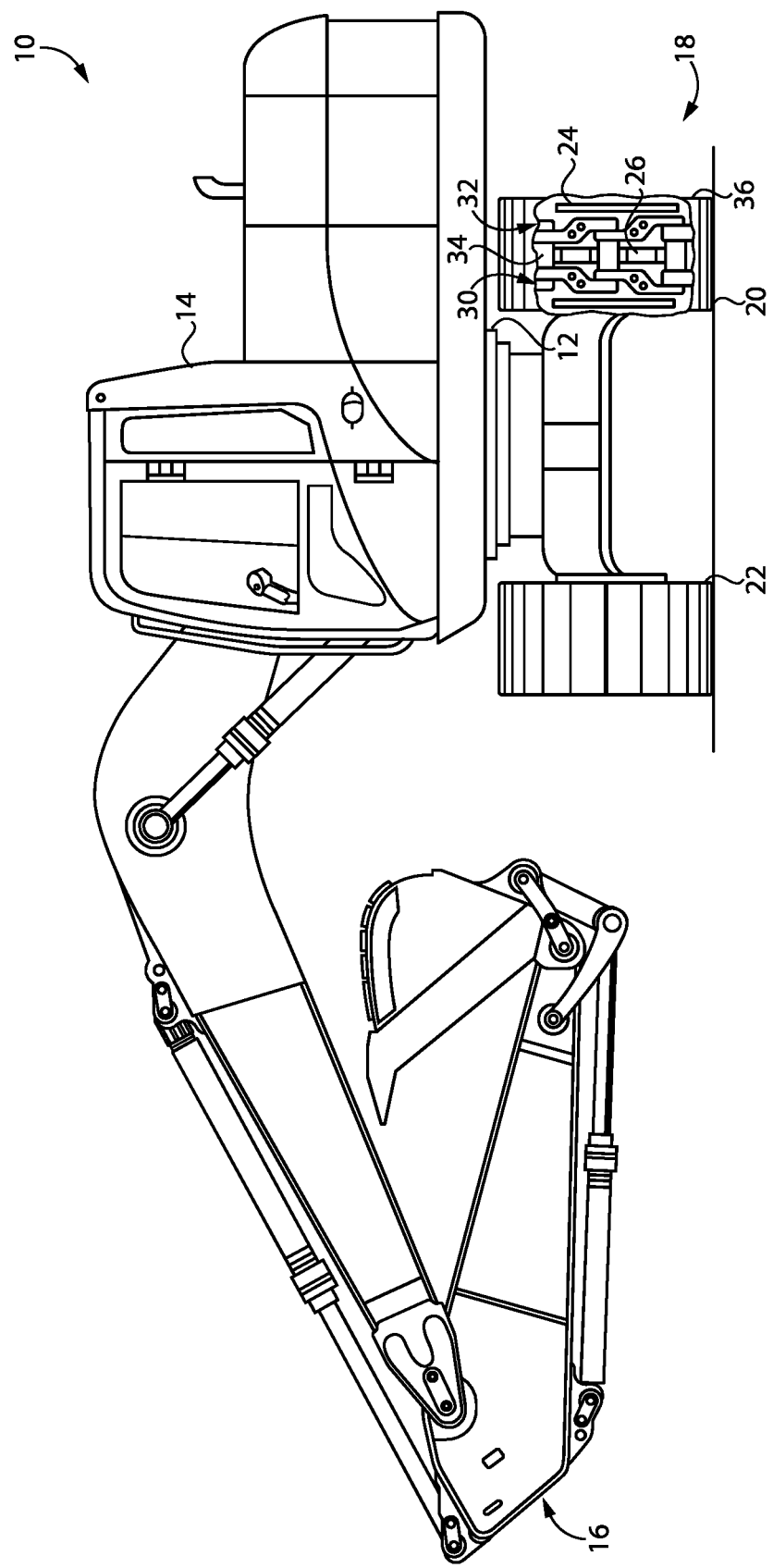
FIG. 1 is a diagrammatic view, partially open, of a machine having a ground-engaging track system, according to one embodiment.

Referring to FIG. 1, there is shown a machine 10 according to one embodiment, and including a frame 12, an operator cab 14 and an implement system 16. Machine 10 further includes a ground-engaging track system 18 for moving machine 10 about a work area. Machine 10 is shown in the context of an excavator, where cab 14 and implement system 16 can be rotated about ground-engaging track system 18. Ground-engaging track system 18 includes a first track 20 and a second track 22 positioned at opposite sides of frame 12. Description and discussion of features and functionality of track 20 and associated components can be understood to refer by way of analogy to track 22, as the respective tracks will typically be substantially identical. Track system 18 also includes a track roller frame 24 structured to support a plurality of rotatable track engaging elements, including a drive sprocket 26 visible in the illustration of FIG. 1, an idler typically positioned at an opposite end of track roller frame 24 from sprocket 26, track rollers structured to support much of the weight of machine 10 and distributed between the idler and drive sprocket 26, and carrier rollers supporting track 20 above track roller frame 24. Track 20 also includes a first track chain 30 and a second track chain 32, and a plurality of track pins 34 coupling together first track chain 30 and second track chain 32. In FIG. 1, drive sprocket 26 is shown in contact with track pins 34, and can be rotated to advance track 20 about the various rotatable track-engaging elements in an endless loop to move machine 10 about a work area. A plurality of track shoes 36 may be mounted to first track chain 30 and second track chain 32, such as by bolting in a generally conventional manner. As will be further apparent from the following description, ground-engaging track system 18 may be uniquely configured for improved resistance to degradation or failure of components and extended service life compared to known systems.

Figure 2:
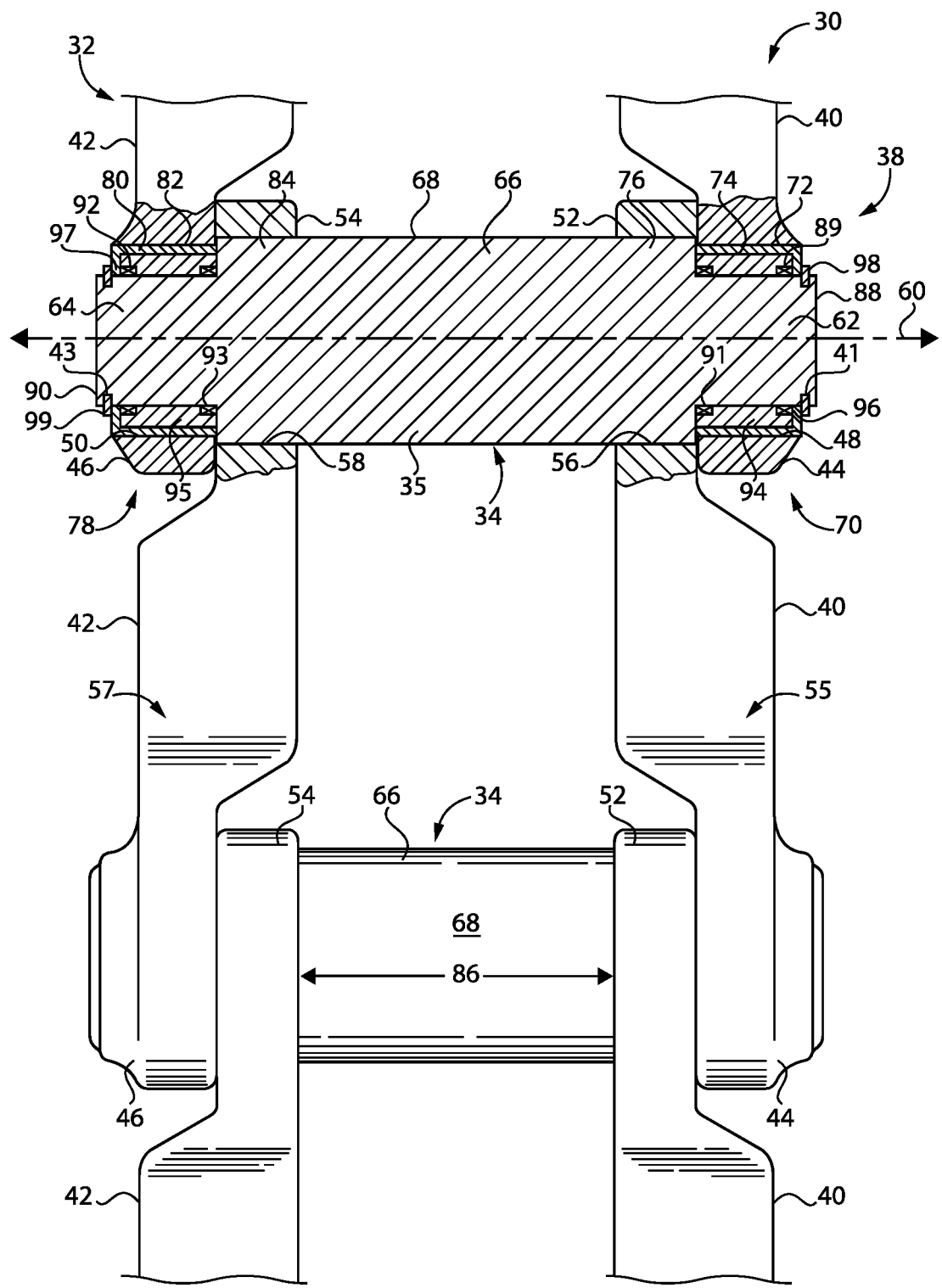
FIG. 2 is a partially sectioned diagrammatic view of a track joint assembly, according to one embodiment.

Referring also now to FIG. 2, ground-engaging track system 18 can include a plurality of track joint assemblies 38, one of which is shown in partially sectioned view. Track joint assembly 38 includes a first track chain 30 and a second track chain 32 each including track links 40 and 42 having, respectively, an outboard link strap 44 and 46 with an outboard pin bore 48 and 50. Track links 40 and 42 also include, respectively, an inboard link strap 52 and 54 with an inboard pin bore 56 and 58. In the illustrated embodiment, track links 40 and 42 are mirror images of one another, and have an offset configuration where outboard link straps 44 and 46 are laterally offset relative to inboard link straps 52 and 54.

Track joint assembly 38 further includes a plurality of track pins 34 each including a solid pin body 35, and each defining a longitudinal axis 60. The plurality of track pins 34, hereinafter referred to in the singular, each include a first pin end 62, a second pin end 64, a center section 66 extending from first pin end 62 to second pin end 64 and having an outer wear surface 68 that contacts drive sprocket 26 within sprocket pockets alternating with sprocket teeth. First track chain 30 includes a first track rail 55 and second track chain 32 includes a second track rail 57. An idler and track rollers (not shown) can ride on track rails 55 and 57 in a generally conventional manner. First pin end 62 includes a first terminal end surface 88 and second pin end 64 includes a second terminal end surface 90.

Track joint assembly 38 further includes a first track joint 70 that includes an outboard link strap 44 in a track link 40 in first track chain 30, first pin end 62, a first interference-fitted insert 72 within the respective outboard pin bore 48 supporting first pin end 62 for rotation, and a first bearing surface 74. First bearing surface 74 extends circumferentially around longitudinal axis 60, and is located radially between first pin end 62 and outboard link strap 44. First track joint 70 further includes an inboard link strap 52 in a track link 40 in first track chain 30, and a first portion 76 of center section 66 positioned in the respective inboard pin bore 56. Track joint assembly 38 also includes a second track joint 78 including an outboard link strap 46 in a track link 42 in second track chain 32, second pin end 64, and a second interference-fitted insert 80 within the respective outboard pin bore 50 and supporting second pin end 64 for rotation. Second track joint 78 also includes a second bearing surface 82 extending circumferentially around longitudinal axis 60, and positioned radially between second pin end 64 and outboard link strap 46. Second track joint 78 still further includes an inboard link strap 54 in a track link 42 in second track chain 32, and a second portion 84 of center section 66 positioned in the respective inboard pin bore 58.

In the illustrated embodiment, first portion 76 and second portion 84 of center section 66 are interference-fitted in the respective inboard pin bores 56 and 58. Also in the illustrated embodiment, each of first interference-fitted insert 72 and second-interference-fitted insert 74 extends axially through the respective outboard pin bore 48 and 50. Each of first track joint 70 and second track joint 78 may further include a rotatable bushing 94 and 95 having the respective bearing surfaces 74 and 82 formed thereon.

As noted above, first pin end 62 and second pin end 64 are supported for rotation by way of first interference-fitted insert 72 and second interference-fitted insert 80. Each of first interference-fitted insert 72 and second interference-fitted insert 80 may include an inwardly extending flange portion 96 and 97, respectively, with rotatable bushings 94 and 95 being trapped axially between center section 66 of track pin 34 and the respective inwardly extending flange portion 96 and 97. Each of first track joint 70 and second track joint 78 may further include a pin retainer 98 and 99 positioned outboard of and adjacent to the respective inwardly extending flange portion 96 and 97. Track pin 34 may also have formed therein a first circumferential groove 41 on first pin end 62, and a second circumferential groove 43 on second pin end 64. Each of pin retainer 98 and pin retainer 99 may include a snap ring fitted into the corresponding groove 41 and 43 as shown, and contacted by inwardly flange portions 96 and 97, respectively, to maintain desired relative axial positioning of first pin end 62 and second pin end 64 in outboard link straps 44 and 46. In alternative embodiments, welded-on plates could be attached to first pin end 62 and 64 in lieu of snap rings within grooves, or some other pin retention strategy could be used.

Also in the illustrated embodiment seals, such as lip seals, may be positioned in first track joint 70 and second track joint 78, including a first seal 91 at an inboard position in track joint 70, and a second seal 89 at an outboard position. Another seal 93 may be positioned at an inboard position in track joint 78, and yet another seal 92 positioned at an outboard position in track joint 78. Bushings 94 and 95 could be self-lubricating bushings or bearings, with no internal lubricant supplied. Each of track joint 70 and track joint 78 could also be grease lubricated. In an excavator implementation the relatively low proportion of tramming time, and other service conditions ordinarily expected, can be consistent with ground-engaging track system 18 being a dry track system, or lubricated by way of self-lubricating or greased bearings. Track system 18 differs from certain other track systems, notably track systems used in many excavators, in that outboard portions of track joints 70 and 78 are rotating pin joint connections, in contrast to other systems where the track pin is interference-fitted with and therefore does not rotate relative to outboard link straps. Also in contrast to certain known track systems and track joint assemblies, no bushing is positioned upon track pin 34 and, instead, contact with sprocket 26 is direct contact between outer wear surface 68 and sprocket 26.

It will be recalled that first portion 76 of center section 66 and second portion 84 of center section 66 may be interference-fitted within inboard link straps 52 and 54, respectively. Accordingly, inboard link straps 52 and 54 do not rotate in such an implementation relative to pin 34 as track 20 is advanced about the various rotatable track-engaging elements. A track guiding space 86 extends between first track chain 30 and second track chain 32. Center section 66 of track pin 34 has an enlarged diameter, relative to first pin end 62 and second pin end 64, and outer wear surface 68 is exposed to track guiding space 86. It can further be noted that track pin 34 has a stepped profile within each of first track joint 70 and second track joint 78. In addition to omitting a center bushing, track joint assembly 38, and other track joint assemblies contemplated herein, differs from certain known designs in that the relatively enlarged diameter of track pin 34 provides sacrificial wear material of track pin 34 itself that can be gradually worn away over the course of a service life of ground-engaging track system 18.

Figure 3:
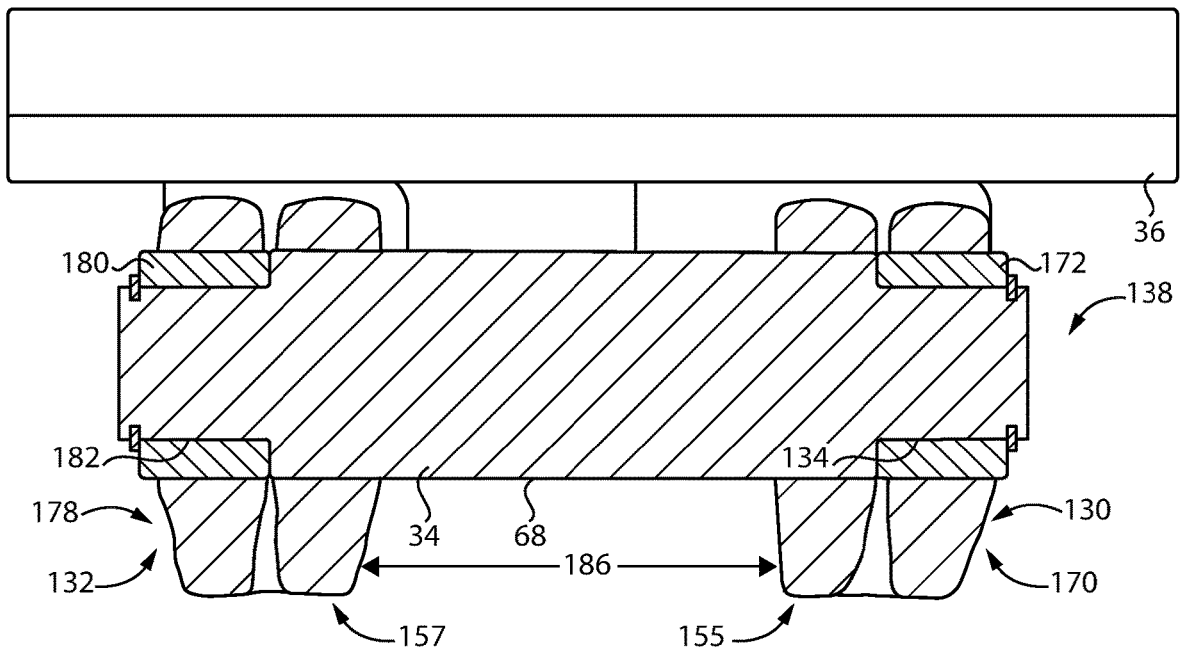
FIG. 3 is a sectioned side diagrammatic view of a track joint assembly, according to one embodiment.

Referring now to FIG. 3, there is shown a track joint assembly 138 according to another embodiment, and using certain reference numerals to identify features that may be the same or identical to features described in connection with the preceding embodiment. Track joint assembly 138 includes a first track joint 170 and a second track joint 178 including track chains 130 and 132 with track rails 155 and 157, respectively. A track guiding space 186 extends between track chains 130 and 132. A track shoe 36 is shown attached to track chains 130 and 132. Track joint assembly 138 also includes a track pin 34 having an outer wear surface 68, with track pin 34 potentially being substantially identical to the track pin discussed in connection with the preceding embodiment. Track joint assembly 138 differs from the preceding embodiment in that rather than a system of interference-fitted inserts and bushings to support opposite ends of track pin 34, only a single inserted element is provided in each track joint to support track pin 34 for rotation. Track pin 34 can include an outer bearing surface 134 formed directly thereon, and rotatable within an interference-fitted bushing 172. Another bearing surface 182 is shown at an opposite end of track pin 34 formed directly thereon, and rotatable within an interference-fitted bushing 180. Track pin 34 may be interference-fitted with inboard track links in track chains 130 and 132 in a manner generally analogous to that of the preceding embodiment.

Figure 4:
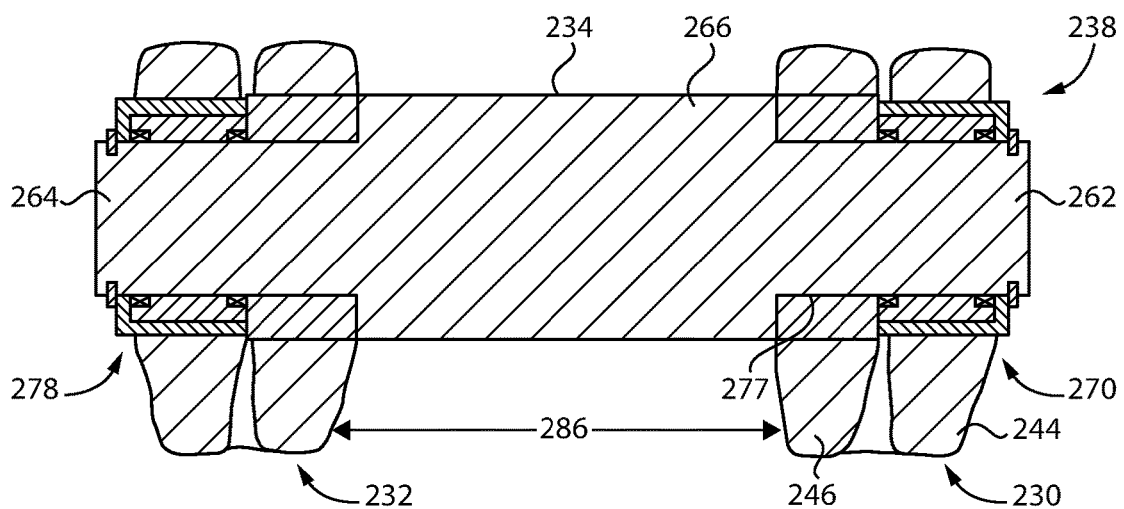
FIG. 4 is a sectioned side diagrammatic view of a track joint assembly, according to one embodiment.

Referring now to FIG. 4, there is shown a track joint assembly 238 according to another embodiment and including a first track chain 230 and a second track chain 232. A first track joint is shown at 270 and a second track joint is shown at 278. Retention of track pin 234 in an outboard link strap 244 can be generally analogous to the embodiment of FIG. 2 where a first pin end 262 of track pin 234 is supported for rotation. A second pin end 264 may be analogously configured and supported. Track pin 234 also includes a center section 266 having an enlarged diameter, relative to first pin end 262 and second pin end 264. A track guiding space 286 extends between track chain 230 and track chain 232. Reference numeral 246 identifies an inboard link strap in track chain 230. Rather than being interference-fitted with inboard link straps, track pin 234 and center section 266 may be rotatably supported and track joint assembly 238 may thus include bearing surfaces, one of which is labeled at 277, rotatably supporting center section 266 within each of the subject inboard link straps.

Figure 5:
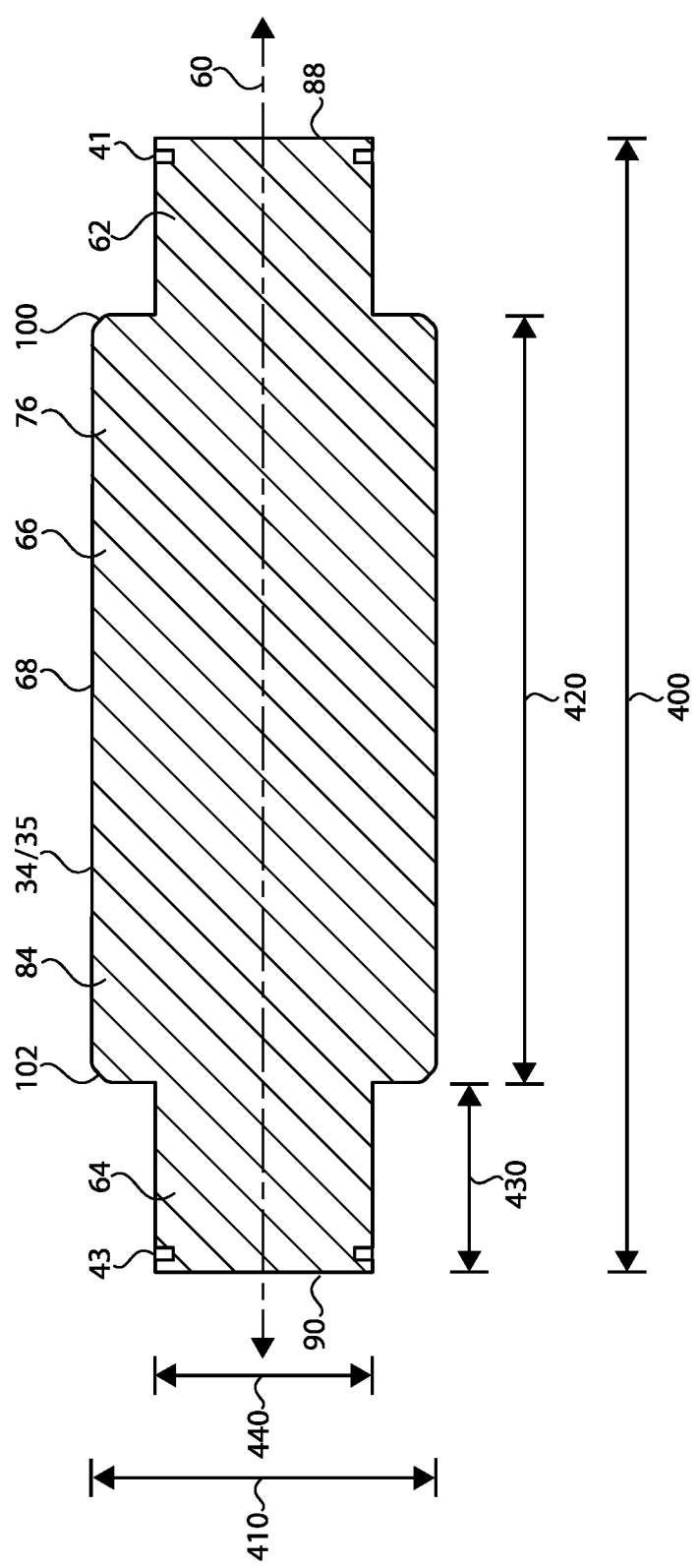
FIG. 5 is a sectioned side diagrammatic view of a track pin, according to one embodiment.

Referring now to FIG. 5 in particular, track pin 34 may be dimensioned and proportioned in a manner that enables the desired configurations and functionality of first track joint 70 and second track joint 78 in at least certain embodiments. A first lead-in chamfer 100 and a second lead-in chamfer 102 are formed on center section 66 adjacent to first pin end 62 and second pin end 64 for interference-fitting, respectively, first portion 76 and second portion 84 of center section 66 with inboard link straps 52 and 54 in first track chain 30 and second track chain 32. Track pin 34, including solid pin body 35, has a full axial length 400 extending between first terminal end 88 and second terminal end 90. First pin end 62 and second pin end 64 may each have a pin end axial length 430, with the pin end axial length 430 being equal on each of first pin end 62 and second pin end 64. It will also be recalled center section 66 has an enlarged diameter shown via reference numeral 410 in FIG. 5. Enlarged diameter 410 is greater than pin end axial length 430. Center section 66 also has a center section axial length 420. Center section axial length 420 is from 60% to 63% of full axial length 400, and from 314% to 318% of pin end axial length 430. In a refinement, enlarged diameter 410 is 50% to 51% of center section axial length 420, and 61% of full axial length 400. Also in the refinement center section axial length 420 is 318% of pin end axial length 430. A pin end diameter is shown at 440 in FIG. 5, and may be approximately equal to pin end axial length 430. In a further refinement, full axial length 400 is about 200 millimeters, more particularly 207 millimeters. In the further refinement, pin end axial length 430 is about 40 millimeters. In the further refinement, enlarged diameter 410 is about 60 millimeters, and more particularly 63 millimeters. In the further refinement center section axial length 420 is about 130 millimeters, more particularly 127 millimeters. The term "about" is understood herein to mean generally or approximately, for example using conventional rounding such that "about 127 millimeters" means from 126.5 millimeters to 127.4 millimeters, within measurement error. In other instances, the term about could have a different or broader meaning to a person skilled in the art than conventional rounding practices, depending upon context.

INDUSTRIAL APPLICABILITY

As discussed above, ground-engaging track system 18, and other track systems contemplated herein, departs from conventional designs in various ways. Track systems are often purpose-built for certain types of machines and/or certain types of working applications. For these and other reasons, track configurations that provide fixed interfaces between certain components, and rotating interfaces between other components, are often not readily adapted to other configurations without potentially affecting the manner and extent of wear or other relationships between or among components. In the present case, ground-engaging track system 18, and track pin 34 in particular, is configured in a manner that can be expected to be installed and operated in a machine such as an excavator without significant modifications or alterations to the track system, or undesired changes in the expected wear patterns or service life. In other words, ground-engaging track system 18 can be installed to an existing excavator platform quite easily. This is due, at least in part, to the design of track pin 34, including its dimensions and proportions, which do not alter factors such as pitch or track width as compared to earlier strategies, and does not require a bushing on the track pin, or further additional components.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track joint assembly comprising:
    a first track chain and a second track chain each including a plurality of track links each having an outboard link strap with an outboard pin bore, and an inboard link strap with an inboard pin bore;
    a track pin defining a longitudinal axis and including a first pin end, a second pin end, and a center section extending from the first pin end to the second pin end and having an outer wear surface;
    a first track joint including an outboard link strap in a first track link in the first track chain, the first pin end, a first interference-fitted insert within the outboard pin bore in the first track link in the first track chain and supporting the first pin end for rotation, and a first bearing surface extending circumferentially around the longitudinal axis;
    the first track joint further including an inboard link strap in a second track link in the first track chain, and a first portion of the center section positioned in the inboard pin bore in the second track link in the first track chain;
    a second track joint including an outboard link strap in a first track link in the second track chain, the second pin end, a second interference-fitted insert within the outboard pin bore in the first track link in the second track chain and supporting the second pin end for rotation, and a second bearing surface extending circumferentially around the longitudinal axis;
    the second track joint further including an inboard link strap in a second track link in the second track chain, and a second portion of the center section positioned in the inboard pin bore in the second track link in the second track chain;
    a track guiding space extending between the first track chain and the second track chain;
    the center section of the track pin has an enlarged diameter, relative to the first pin end and the second pin end, and the outer wear surface is exposed to the track guiding space;
    the first pin end is rotatable relative to the first interference-fitted insert, and the second pin end is rotatable relative to the second interference-fitted insert; and
    the first track joint and the second track joint further including, respectively, a first bearing surface located between the first pin end and the first interference-fitted insert, and a second bearing surface located between the second pin end and the second interference-fitted insert.

2. The track joint assembly of claim 1 wherein the track pin has a stepped profile within each of the first track joint and the second track joint.

3. The track joint assembly of claim 2 wherein the first portion of the center section and the second portion of the center section are interference-fitted in the respective inboard pin bores.

4. The track joint assembly of claim 3 wherein:
    the first pin end and the second pin end each include a terminal end surface, and have a pin end axial length extending between the respective terminal end surface and the center section; and
    the enlarged diameter is greater than the pin end axial length.

5. The track joint assembly of claim 4 wherein:
    the center section has a center section axial length, and the track pin has a full axial length; and
    the center section axial length is from 60% to 63% of the full axial length, and from 314% to 318% of the pin end axial length.

6. The track joint assembly of claim 5 wherein:
    the enlarged diameter is 50% of the center section axial length:
    the center section axial length is 61% of the full axial length; and
    the center section axial length is 318% of the pin end axial length.

7. The track joint assembly of claim 2 further comprising bearing surfaces rotatably supporting the center section within each of the inboard link straps.

8. The track joint assembly of claim 1 wherein each of the first interference-fitted insert and the second interference-fitted insert extends axially through the respective outboard pin bore.

9. The track joint assembly of claim 8 wherein each of the first track joint and the second track joint further includes a rotatable bushing having the respective bearing surface formed thereon.

10. The track joint assembly of claim 9 wherein:
    each of the first interference-fitted insert and the second interference-fitted insert includes an inwardly extending flange portion, and the rotatable bushings are trapped between the center section of the track pin and the respective inwardly extending flange portion; and
    each of the first track joint and the second track joint includes a pin retainer positioned outboard of and adjacent to the respective inwardly extending flange portion.

11. A ground-engaging track system comprising:
    a track roller frame;
    a ground-engaging track having a first track chain and a second track chain, each including a plurality of track links, and a plurality of track pins each defining a longitudinal axis and coupling the first track chain and the second track chain together;
    the track links each including an outboard link strap and an inboard link strap;

the track pins each including a first pin end extending through and supported for rotation in a respective outboard link strap, relative to the respective outboard link strap, in a respective one of the plurality of track links in the first track chain, a second pin end extending through and supported for rotation in a respective outboard link strap, relative to the respective outboard link strap, in a respective one of the plurality of track links in the second track chain, and a center section extending from the first pin end to the second pin end;

a track guiding space extends between the first track chain and the second track chain;

the center section of each of the track pins including an enlarged diameter, relative to the first pin end and the second pin end, positioned in part within inboard link straps in a different one of the plurality of track links in each of the first track chain and the second track chain, and forming an outer wear surface exposed to the track guiding space; and the ground-engaging track system further comprising interference-fitted inserts each extending through one of the outboard link straps, and bearing surfaces each located radially between one of the interference-fitted inserts and the first pin end or second pin end of the respective track pin.

12. The ground-engaging track system of claim 11 further comprising a sprocket in contact with the outer wear surface of a plurality of the track pins within the track guiding space.

13. The ground-engaging track system of claim 11 wherein each of the bearing surfaces is formed upon a rotatable bushing.

14. The ground-engaging track system of claim 13 wherein the interference-fitted inserts each include an inwardly extending flange portion, and each of the rotatable bushings is trapped between one of the inwardly extending flange portions and the center section of the respective track pin.

15. The ground-engaging track system of claim 14 wherein the center section of each of the track pins is interference-fitted in the respective inboard link straps.

16. The ground-engaging track system of claim 15 wherein:

each of the track pins defines a longitudinal axis;

the center section has a center section axial length, and the track pin has a full axial length; and the center section axial length is 60% to 63% of the full axial length, and 314% to 318% of the pin end axial length.

17. A track pin for a track joint assembly in a ground-engaging track system comprising:

a solid, one-piece pin body defining a longitudinal axis extending between a first pin end having a first terminal end surface, a second pin end having a second terminal end surface, and a center section extending between the first pin end and the second pin end;

the center section includes a first lead-in chamfer and a second lead-in chamfer formed adjacent to the first pin end and the second pin end for interference-fitting, respectively, a first portion and a second portion of the center section with inboard link straps in the first track chain and the second track chain;

the solid, one-piece pin body has a full axial length;

the first pin end and the second pin end each have a pin end axial length;

the center section has an enlarged diameter, relative to the first pin end and the second pin end, and a center section axial length;

the enlarged diameter is greater than the pin end axial length; and the center section axial length is from 60% to 63% of the full axial length, and from 314% to 318% of the pin end axial length.

18. The track pin of claim 17 wherein:

the enlarged diameter is 50% of the center section axial length;

the center section axial length is 61% of the full axial length; and the center section axial length is 318% of the pin end axial length.

19. The track pin of claim 18 wherein:

the full axial length is 207 millimeters;

the pin end axial length is 40 millimeters;

the enlarged diameter is 63 millimeters; and the center section axial length is 127 millimeters.

* * * * *